United States Patent [19]

Küter et al.

[11] 4,095,333
[45] Jun. 20, 1978

[54] METHOD OF INTRODUCING THE COILS OF A SUPERCONDUCTIVE EXCITER WINDING INTO THE SLOTS OF A TURBOGENERATOR ROTOR

[75] Inventors: Heinrich Küter, Wattenscheid; Erich Weghaupt, Mülheim, both of Germany

[73] Assignee: Kraftwerk Union Aktiengesellschaft, Mülheim (Ruhr), Germany

[21] Appl. No.: 766,962

[22] Filed: Feb. 9, 1977

[30] Foreign Application Priority Data

Feb. 12, 1976  Germany ............................ 2605640

[51] Int. Cl.² ........................................ H02K 15/09
[52] U.S. Cl. ........................................ 29/598; 29/605
[58] Field of Search ..................... 29/598, 599, 605; 310/10, 40 R, 52, 198, 201–203, 208

[56] References Cited

U.S. PATENT DOCUMENTS 3,870,913   3/1975   Shapiro et al. ..................... 310/208
3,942,053   3/1976   Abolins et al. ..................... 310/10 X Primary Examiner—Carl E. Hall
Attorney, Agent, or Firm—Herbert L. Lerner

[57] ABSTRACT

Method of introducing the coils of a superconductive exciter winding into slots formed in a winding support member of a turbogenerator rotor with respectively two coil sides formed of a multiplicity of mutually superimposed conductors in each slot, the slots having a radially extending cross section with the base thereof disposed at the radially inward end thereof, which includes winding first an inner coil and then an outer coil of a pair of concentric coils forming respective parts of a double coil into two of the slots spaced from one another in accordance with the respective width of the coil, the inner and the outer coils into the respective slots being continuously wound beginning at the slot base and in respective opposite rotary sense so that a non-interrupted transition from the inner coil to the outer coil occurs at the slot base.

4 Claims, 4 Drawing Figures

METHOD OF INTRODUCING THE COILS OF A SUPERCONDUCTIVE EXCITER WINDING INTO THE SLOTS OF A TURBOGENERATOR ROTOR

The invention relates to a method of introducing winding into the slots of the winding support member of a turbogenerator rotor with respectively two coil sides formed of a multiplicity of mutually superimposed conductors in each slot.

Such a winding is known, for example, from patent application Ser. No. 583,158, filed June 2, 1975 of Erich Weghaupt, one of the coinventors of the instant application. In contrast to the windings of conventional generators, wherein the individual conductor bars, after being inserted into the slots, are connected to one another in the end portion of the conductor connections, superconductive winding should have as few conductor connections as possible. This requirement is especially difficult to fulfill if two stacks of conductors per slot are provided.

It is accordingly an object of the invention to provide a method of introducing such windings into rotor slots wherein, disregarding conductor connections required due to changes in cross section or profile, no further soldered joints within a coil are required and whereby, moreover, the coil connections to neighboring coils are disposed at readily accessible locations.

With the foregoing and other objects in view, there is provided, in accordance with the invention, a method of introducing the coils of a superconductive exciter winding into slots formed in a winding support member of a turbogenerator rotor with respectively two coil sides formed of a multiplicity of mutually superimposed conductors in each slot, the slots having a radially extending cross section with the base thereof disposed at the radially inward end thereof, which comprises winding first an inner coil and then an outer coil of a pair of concentric coils forming respective parts of a double coil into two of the slots spaced from one another in accordance with the respective width of the coil, the inner and the outer coils into the respective slots being continuously wound beginning at the slot base and in respective opposite rotary sense so that a non-interrupted transition from the inner coil to the outer coil occurs at the slot base.

With such a method, it is possible to install a double coil into the rotor, in a relatively simple manner, without additional soldering joints.

In accordance with another mode of the invention, the method comprises forming a cranked location in a respective end portion of the inner and the outer coils extending in circumferential direction thereof for balancing the coil transition at the slot base.

In accordance with a further mode of the invention, the method comprises inserting filling conductors into the respective slots for balancing the cranked location.

In accordance with a concomitant mode of the invention, the method comprises disposing respective coil connectors at the beginning and the end of the double coil at the radially outermost conductors in the respective slot.

Other features which are considered as characteristic for the invention are set forth in the appended claims.

Although the invention is illustrated and described herein as a method of introducing the coils of a superconductive exciter winding into the slots of a turbogenerator rotor, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawings, in which.

Figure 1:
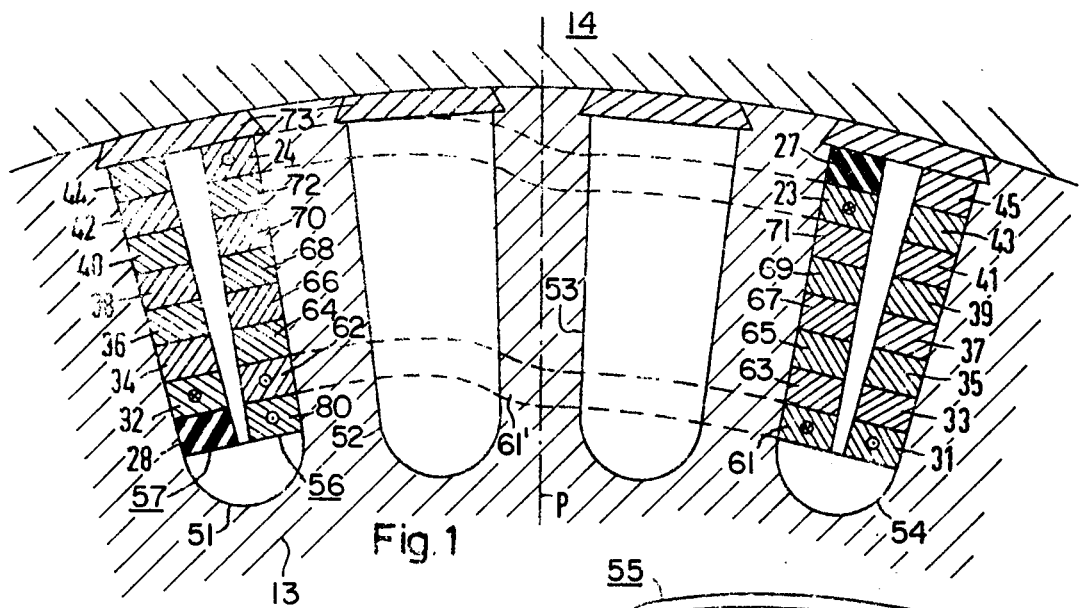
FIG. 1 is a fragmentary cross-sectional view of a turbogenerator rotor showing the slots formed in the winding support cylinder thereof and the superconductive exciter winding wound into the slots in accordance with the method invention.
Figure 4:
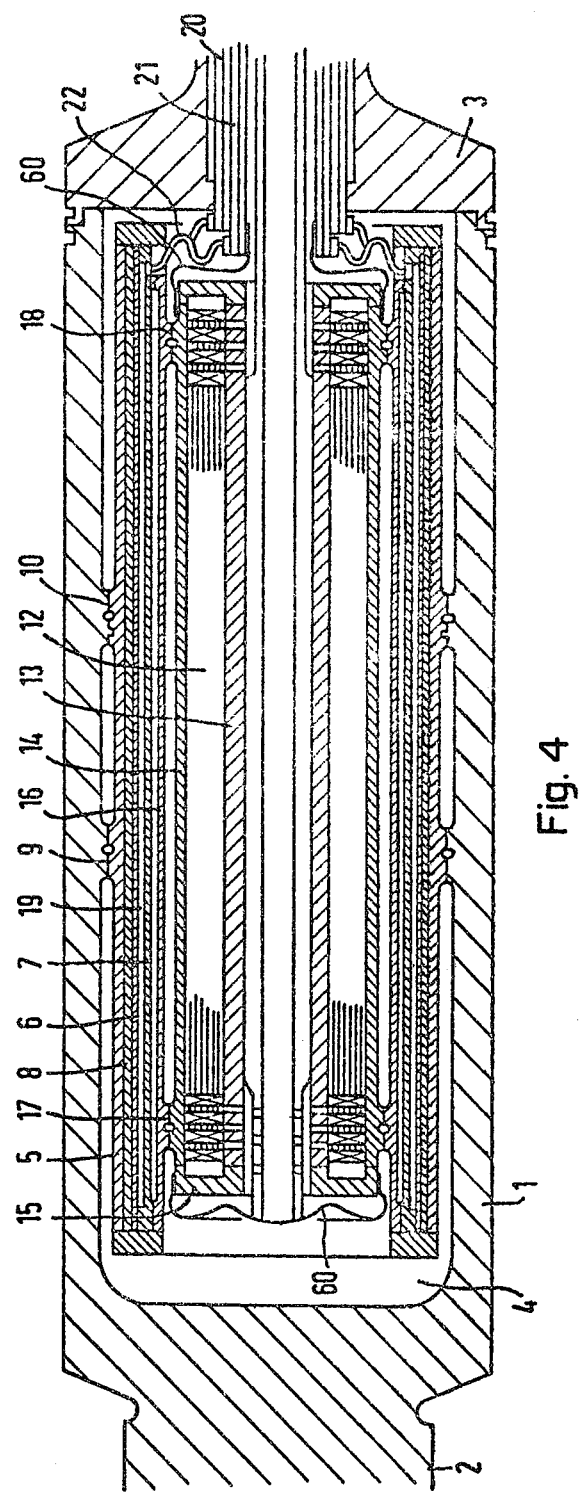
FIG. 4 is a longitudinal sectional view of the turbogenerator rotor wound with the superconductive exciter winding in accordance with the method invention of the instant application.

Referring now to the drawings and first, particularly, to FIG. 4 thereof, there is shown an outer rotor body 1 formed as a hollow cylinder and closed at the end 2 thereof facing the turbine and flanged vacuum-tightly to a non-illustrated exciter shaft by a further non-illustrated coupling at the end 3 of the rotor body 1 facing the exciter. The rotor body 1 is formed with an inner chamber 4 that is evacuated. In the inner chamber 4, in radial direction from the outside to the inside thereof, three concentric steel cylinders 5, 6 and 7 with an interposed damper winding 8 are disposed. The three steel cylinders 5, 6 and 7 with the damper winding 8 are connected to the outer rotor body 1 through articulating points 9 and 10 which have a high thermal resistance. A winding coil 55 proper, as can be seen particularly from FIG. 1, is embedded in slots or recesses 51 formed at the outer periphery of a winding support cylinder 13, over which a bracing cylinder 14 is press-fitted. Both cylinders 13 and 14 are force-lockingly connected to each other at their ends through a cover 15 and closed off by caps 60, so that a closed winding space is provided which is separated from the evacuated inner chamber 4.

The cylinders 13 and 14 containing the winding are connected through a spring cylinder 16 and appropriate articulating points 17 and 18 to the three cylinders 5, 6 and 7. The damper formed of the cylinders 5, 6 and 7 and the damper winding 8 also fulfills the function of a cold shield. All of the gaps or spaces between the cylinders 5, 6, 7 and 16 are evacuated.

The damper winding 8 is cooled through cooling channels 19, which are traversed by coolant supplied through concentric channels 20 and 21 and through connecting hoses 22.

Figure 2:
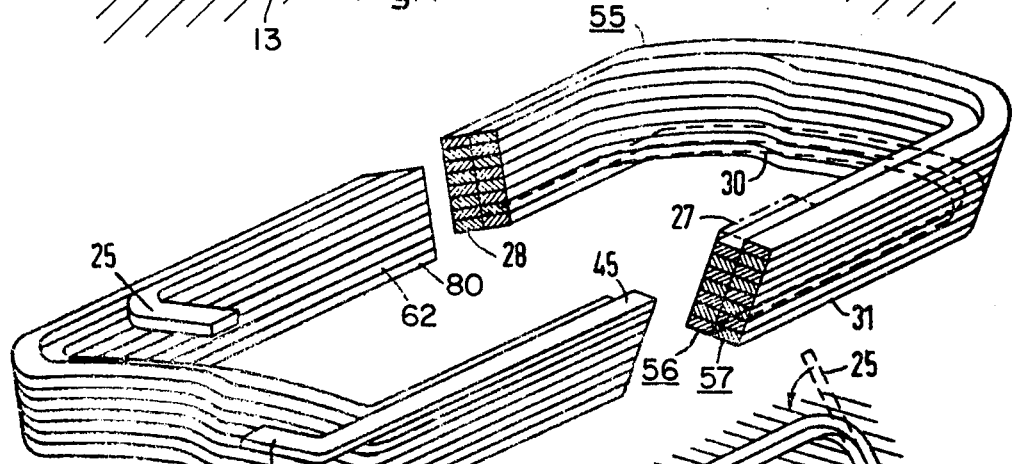
FIG. 2 is a reduced perspective view of a double coil of the superconductive exciter winding shown in FIG. 1.

In the enlarged partial sectional view of the rotor shown in FIG. 1, two slots 51 and 52, on the one hand, and 53 and 54, on the other hand, are disposed on respective sides of the middle P of the pole, a double winding coil 55 according to the construction thereof illustrated in FIG. 2 having previously been fully wound into the slots 51 and 54. The double coil 55 is formed of an inner coil 56 and an outer coil 57 which extend concentrically or coaxially to one another, in composite form, and which, according to the illustrated embodiment of FIGS. 1 and 2, for example, are made up of eight conductor layers, respectively.

The method invention of the instant application for introducing the coil 55 into the slots 51 and 54 is explained hereinafter with respect to FIGS. 1 and 2. It may be assumed that the entire length of the double coil 55 exists as an uninterrupted conductor band or strip, any conductor connections or joints that may possibly be required due to changes in cross section or profile being disregarded. Both partial coils 56 and 57 are to be wound continuously upwardly starting from the slot base, beginning with the inner coil 56. In addition thereto, the inner coil 56, beginning with the conductor section 80 and starting from the middle of the entire conductor band, is initially inserted into the slot 51 in the direction indicated by the arrow i.e. the circle surrounding a dot, toward the viewer. After running through the forward end section shown in FIG. 2, the conductor band is inserted into the slot 54 and extends therethrough as conductor section 61. At the rear end of the slot 54, an end connection 61' occurs which is shown in broken lines in FIG. 1 and which has a cranked location that is explained hereinafter. Returning into the slot 51, the conductor band runs through the latter slot in the second layer thereof as the conductor section 62, and returns then through the forward end bow into the slot 54, as conductor section 63. In this manner, the inner coil 56 with the conductor sections 80, 62, 64, 66, 68, 70, 72 and 24 are wound in the slot 51 and the conductor sections 61, 63, 65, 67, 69, 71, 23 and 27 are wound in the slot 54. The starting coil end 25, as shown in FIG. 2, is bent laterally and provides a connection with or terminal for the next coil.

After the inner coil 56 has been wound into the slots 51 and 54, the outer coil 57 is then wound, starting from the conductor band half connected to the conductor section 80 and still remaining free. For that purpose, the conductor band is passed over the rear end bow at the outside of the slot 51 and then appears as conductor section 31 in the slot 54. The course of the transition conductor section 30 is shown in broken lines in FIG. 2. After the conductor section 31 has passed through the slot 54, it goes into the forward end bow, which also has a cranked location, and then becomes the conductor section 32 as it passes through the slot 51. The outer coil 57 is then continuously wound in the hereinaforedescribed manner until all the conductor sections 32, 34, 36, 38, 40, 42 and 44 have been placed in the slot 51 and the conductor sections 31, 33, 35, 37, 39, 41, 43 and 45 in the slot 54. The end of this conductor band is then also led out of the coil as the coil end 46, according to FIG. 2, and is connected to the next coil.

Figure 3:
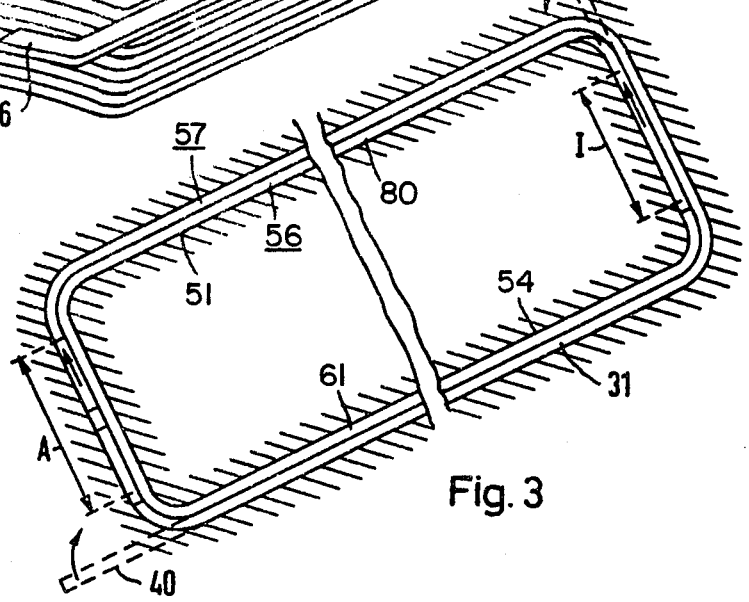
FIG. 3 is a further reduced diagrammatic plan view of FIG. 2.

The starting end of the winding coil at the slot base is again shown in plan view in FIG. 3. The conductor section 80 serves as the starting end of the winding coil, from which the inner coil 56 is wound counterclockwise in the direction indicated by the associated arrow in FIG. 3. After running through the slot 54 with the conductor section 61, the cranked region I for the inner coil is produced in the rear end bow, the next layer being then disposed above the conductor section 80. For the outer coil 57, the other end is guided from the conductor section 80 into the outer layer and then appears as the conductor section 31 in the slot 54. The cranked region for the outer coil, which is now wound clockwise, is identified at A.

The hollow spaces of the coils that are formed due to the cranked locations and the transitional lines from the inner to the outer coils are filled-in at the slot base in the slot 51 by a filling conductor 28 and in the upper layer in the slot 54 by a similar filling conductor 27.

With the hereinaforedescribed winding method of the invention, a double coil from a superconductive conductor can be wound in a relatively simple manner into the respective slots without requiring any additional conductor connections or joints at the end connections or at the transition locations from the inner to the outer coil. The transition from the inner to the outer coil is disposed in the slot base, while the coil connections from slot to slot is located radially outside at readily accessible locations.

After effecting the winding of the coil into the respective slots, wedges 73 are provided at the top of the respective slots for retaining the coil in the slots, and the bracing cylinder 14 is then shrink-fitted on the winding support cylinder 13.

We claim:

1. Method of introducing the coils of a superconductive exciter winding into slots formed in a winding support member of a turbogenerator rotor, the slots having a radially extending cross section with the base thereof disposed at the radially inward end thereof, which comprises winding first an inner coil and then an outer coil of a pair of concentric coils forming respective parts of a double coil into two of the slots spaced from one another in accordance with the respective width of the coil, the inner and the outer coils in the respective slots being continuously wound beginning at the slot base and in respective opposite rotary sense so that a non-interrupted transition from the inner coil to the outer coil occurs at the slot base.

2. Method according to claim 1 which comprises forming a cranked location in a respective end portion of the inner and the outer coils extending in circumferential direction thereof for balancing the coil transition at the slot base.

3. Method according to claim 2 which comprises inserting filling conductors into the respective slots for balancing the cranked location.

4. Method according to claim 1 which comprises disposing respective coil connectors at the beginning and the end of the double coil at the radially outermost conductors in the respective slot.

* * * * *